C. PETERSON.
DRAFT EQUALIZER.
APPLICATION FILED NOV. 17, 1914.
1,133,179.
Patented Mar. 23, 1915.
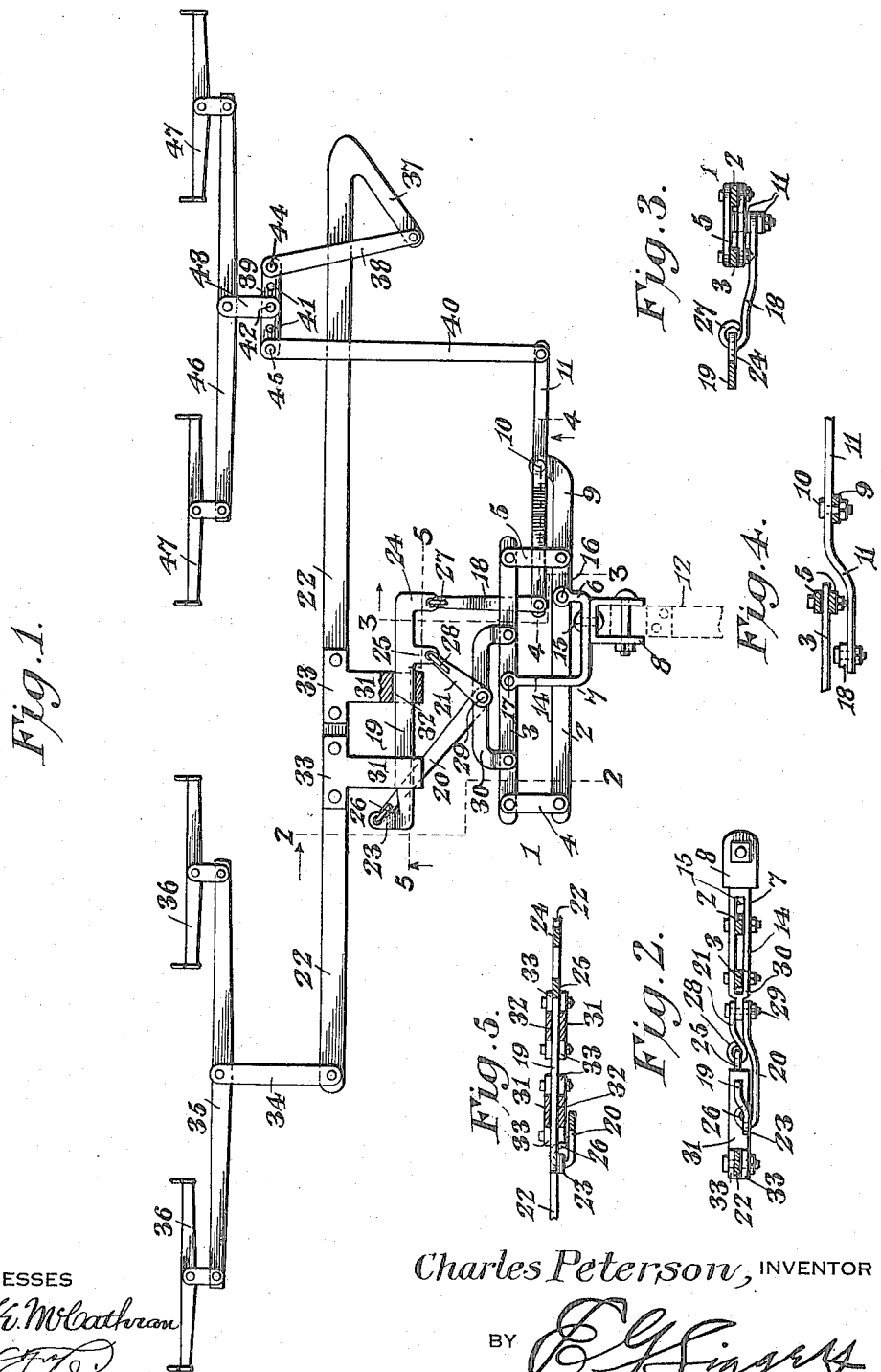
WITNESSES
Charles Peterson, INVENTOR
BY
ATTORNEY

UNITED STATES PATENT OFFICE.

CHARLES PETERSON, OF CARROLL, IOWA.

DRAFT-EQUALIZER.

1,133,179.  Specification of Letters Patent.  Patented Mar. 23, 1915.

Application filed November 17, 1914. Serial No. 872,574.

*To all whom it may concern:*

Be it known that I, CHARLES PETERSON, a citizen of the United States, residing at Carroll, in the county of Carroll and State of Iowa, have invented a new and useful Draft-Equalizer, of which the following is a specification.

The invention relates to improvements in draft equalizers.

The object of the present invention is to improve the construction of draft equalizers and to provide a simple, practical, and inexpensive draft equalizer of light, strong, and durable construction, designed for use on plows and various other agricultural implements, and adapted to afford a straight pull and capable of equalizing the draft between four horses.

A further object of the invention is to provide a draft equalizer of this character adapted to provide for an increased spread of the whiffletree so as to afford the horses plenty of room to work without one horse interfering with the other.

With these and other objects in view the invention consists in the construction and novel combination of parts hereinafter fully described, illustrated in the accompanying drawings, and pointed out in the claims appended hereto, it being understood that various changes in the form, proportion, size and minor details of construction, within the scope of the claims, may be resorted to without departing from the spirit or sacrificing any of the advantages of the invention.

In the drawings:—Figure 1 is a plan view, partly in section, of a draft equalizer constructed in accordance with this invention. Fig. 2 is a longitudinal sectional view on the line 2—2 of Fig. 1. Fig. 3 is a similar view on the line 3—3 of Fig. 1. Fig. 4 is a detail transverse sectional view on the line 4—4 of Fig. 1. Fig. 5 is a similar view on the line 5—5 of Fig. 1.

Like numerals of reference designate corresponding parts in all the figures of the drawings.

In the acompanying drawings, in which is illustrated the preferred embodiment of the invention, the draft equalizer comprises in its construction a pivoted lever frame 1 disposed transversely of the line of draft and composed of a rear bar or lever 2 and a front bar or lever 3, connected with the rear bar or lever by links 4 and 5, pivoted at their terminals to the bars or levers 2 and 3 and preferably arranged in pairs, but single links may, of course, be employed. The bar or lever 2, which is pivoted at an intermediate point to a short arm 6 of an approximately U-shaped member 7 of a plow clevis 8, is extended at the right hand end to form a projecting portion 9, which is connected by a bolt or other suitable fastening device 10 to a rear transversely disposed equalizing lever 11. The clevis 8, which is approximately U-shaped, may be of any other desired construction, and it is shown applied to a plow beam 12, illustrated in dotted lines in Fig. 1 of the drawing, but the draft equalizer may be applied to various agricultural implements and machines and may also be used in other places where it is desired to equalize the draft between four horses. The member 7 is composed of the short arm 6, a relatively long arm 14, and a transverse connecting portion which is secured by a rivet 15 or other suitable fastening means to the front of the clevis. The short arm 6 extends to and is connected by a pivot 16 to the rear bar or lever 2, and the relatively long arm extends forwardly in advance of the short arm and is connected by a pivot 17 to the front bar or lever 3. The pivoted lever frame projects at opposite sides of the plow beam and the rear equalizing lever 11, which is located at the right hand side of the beam, is pivoted at an intermediate point by the said bolt 10 to form inner and outer arms of unequal length, the inner arm being slightly longer than the outer arm.

The inner arm of the rear equalizing lever 11 is connected by a longitudinal link 18 with an intermediate equalizing bar or lever 19, located in advance of the pivoted frame and connected with the same by forwardly extending links 20 and 21. The intermediate transversely disposed equalizing bar or lever 19, which is slidably connected intermediate of its ends at spaced points with a main front equalizing bar or lever 22, is provided at one end with a forwardly extending arm 23, and at the other end and at an intermediate point with spaced rearwardly extending arms 24 and 25, the arms 23, 24, and 25 being arranged at right angles to the bar or lever 19 and preferably formed integral therewith. The forwardly extending arm 23 is movably connected to the front end of the link 20 and the intermediate rearwardly extending arm 25 is similarly connected to the front end of the link 21. The link 20, which is connected with the arm 23, is of greater length than the link 21, and extends to a point in advance of the equalizing bar or lever 19, while the other link is located wholly in rear of the said bar or lever 19. The link 18, which is longitudinally disposed, extends forwardly from the inner end of the rear equalizing lever to the adjacent end of the intermediate equalizing bar or lever, and is loosely connected with the rearwardly extending arm 24 thereof. The arms 23, 24, and 25 are preferably provided with perforations into which the front ends 26, 27, and 28 of the said links are hooked, but any other suitable means may, of course, be employed for connecting the links 18, 20, and 21 with the intermediate equalizing bar or lever. The rear ends of the forwardly diverging links 20 and 21 are connected by a bolt or other suitable pivot 29 to the upper and lower faces of an approximately U-shaped member 30, consisting of a bar or piece located in advance of the front bar 3 and having rearwardly extending terminals, riveted or otherwise secured to the same at spaced points. The front main equalizing bar or lever 22, which extends a considerable distance beyond each side of the plow beam to provide an increased spread of the whiffletrees and to afford plenty of room for the draft animals to work without interfering with one another, is provided at an intermediate point with guiding means consisting of a pair of spaced rearwardly extending lugs 31, provided with transversely alined openings 32 which receive the intermediate equalizing bar or lever 19. The guiding lugs are preferably provided with bifurcated front attaching portions 33, which are riveted or otherwise secured to the front main equalizing bar or lever. The intermediate equalizing bar or lever 19, which has a limited sliding movement in the guide lug, is limited in such movement by means of the arms 23 and 25 which are located at opposite sides of the guiding means, but any other suitable means may, of course, be employed for this purpose.

The left hand end of the front main equalizing bar or lever 22 is connected by a link 34 with a double tree 35, which is provided at its ends with swingletrees 36, to which the horses of one team are connected. The main equalizing bar or lever is provided at its other or right hand end with a horizontally projecting arm 37, extending inwardly at an acute angle and connected by a link or rod 38 with the right hand end of a short transversely disposed coupling lever 39, which is connected at its other end with the rear equalizing lever 11 by a link or rod 40. The transverse coupling lever, which is located in advance of the main front equalizing bar or lever, is provided with a plurality of perforations 41, arranged at intervals and adapted to receive a pivot 42 of a central link 43, and pivots 44 and 45 for connecting the front ends of the links or rods 38 and 40 with the coupling lever. The link 43 is pivotally connected at its front end to a double tree 46, which is equipped at its ends with swingletrees 47 for the attachment of the horses of the other team. The perforations of the coupling lever permit an adjustment of the connections between the double tree 46 and the front ends of the links or rods 38 and 40.

When the right hand team exerts a strong pull on the draft equalizer, tending to draw the right hand arm of the main equalizing bar or lever 22 forward, such pull, operating through the link 40 and the rear equalizing lever 11, also tends to draw the right hand end of the intermediate equalizing bar or lever rearward, and thereby throw the left hand end forward, carrying with the same the left hand arm of the main equalizing bar or lever. An excessive strain on the left hand end of the main equalizing bar or lever acts, through the mechanism, the reverse of a right hand pull, and tends to throw the right hand arm of the main equalizing bar or lever forward. In this manner the draft between the two teams is equalized, and each animal is obliged to pull only his proportion of the load, and no more. The relatively long front equalizing bar or lever provides for a considerable spread of the whiffletrees, so that the operation of the equalizer will not cause the draft animals to interfere with one another. The short link 21, which diverges from the link 20, serves to equalize the strain and this, together with the connection of the front and rear bars of the pivoted lever frame with the clevis, enables the draft equalizer to be constructed of relatively light material, without impairing its strength and durability.

What is claimed is:

1. A draft equalizer including a pivoted transversely disposed lever frame, a rear equalizing lever connected at an intermediate point with the said frame at one end thereof, an intermediate equalizing lever connected with the said frame, means for connecting the inner ends of said equalizing levers with each other, a front or main equalizing lever movably connected with the intermediate equalizing lever, whiffletrees located at the ends of the front or main equalizing lever, means for connecting one of the whiffletrees to one end of the front equalizing lever, and means for connecting the other whiffletree with the other end of the front equalizing lever and with the rear equalizing lever.

2. A draft equalizer including a pivoted transversely disposed lever frame, a rear equalizing lever connected at an intermediate point with said frame at one end thereof, an intermediate equalizing lever also connected with the said frame, means for connecting the inner ends of the said equalizing levers with each other, a front or main equalizing lever provided with a guide slidably receiving the intermediate equalizing lever, whiffletrees located at the ends of the front or main equalizing lever, means for connecting one of the whiffletrees to one end of the front equalizing lever, and means for connecting the other whiffletree with the other end of the front equalizing lever and with the rear equalizing lever.

3. A draft equalizer including a transverse lever frame, a rear equalizing lever connected at an intermediate point with the said frame at one end thereof, an intermediate equalizing lever also connected with the said frame, means for connecting the inner ends of the said equalizing levers with each other, a front or main equalizing lever provided with guiding means having spaced lugs slidably receiving the intermediate equalizing lever, the latter being provided with means for engaging the said lugs for limiting its sliding movement, whiffletrees located at the ends of the front equalizing lever, means for connecting one of the whiffletrees to one end of the front equalizing lever, and means for connecting the other whiffletree with the other end of the front equalizing lever and with the rear equalizing lever.

4. A draft equalizer including a transverse lever frame, a rear equalizing lever pivotally connected at an intermediate point to the lever frame at one end thereof, an intermediate equalizing lever located in advance of the lever frame, forwardly diverging links pivotally connected at their rear ends with the lever frame, said links being connected at their front ends to the intermediate equalizing lever at spaced points, means for connecting the inner ends of the rear and intermediate equalizing levers, a front equalizing lever movably connected with the intermediate equalizing lever, a whiffletree connected with one end of the front equalizing lever, and another whiffletree connected with the other end of the front equalizing lever.

5. A draft equalizer including a transverse lever frame, a rear equalizing lever connected with the lever frame at one end thereof, an intermediate equalizing lever located in advance of and also connected with the said frame, means for connecting the inner ends of the equalizing levers, a front equalizing lever connected with the intermediate equalizing lever and provided at one end with an arm extending rearwardly toward the rear equalizing lever, a coupling lever, links or rods connecting the coupling lever with the said rearwardly extending arm of the front equalizing lever and with the outer end of the rear equalizing lever, and opposite whiffletrees connected respectively with the coupling lever and with the front equalizing lever.

6. A draft equalizer including a transverse lever frame, a rear equalizing lever connected with the frame at one end thereof, an intermediate equalizing lever located in advance of the said frame, forwardly diverging links pivotally connected at their rear ends with the frame, said links being also connected at their front ends with the intermediate equalizing lever at spaced points in advance and in rear of said lever, means for connecting the inner ends of the rear and intermediate equalizing levers, a front equalizing lever connected with the intermediate equalizing lever, whiffletrees located at the ends of the front equalizing lever and connected therewith, and means for connecting the outer end of the rear equalizing lever with one of the whiffletrees.

7. A draft equalizer including a clevis provided with a member having spaced forwardly extending relatively long and short arms, a transverse lever frame composed of front and rear bars or members pivoted respectively to the long and short arms of the said member, a rear equalizing lever connected with the lever frame at one end, an intermediate equalizing lever located in advance of the said frame and also connected with the same, means for connecting the inner ends of the said equalizing levers, a front main equalizing lever, whiffletrees connected with the main equalizing lever, and means for connecting one of the whiffletrees with the rear equalizing lever.

8. A draft equalizer including a transverse lever frame, a rear equalizing lever pivotally connected with the lever frame at one end thereof, a front main equalizing lever provided with spaced rearwardly extending guides, an intermediate equalizing lever slidable in the guides and provided at one end with a forwardly extending arm and at its other end and at an intermediate point with rearwardly extending arms, the forwardly extending arm and the intermediate rearwardly extending arm being located at opposite sides of the said guides and limiting the sliding movement of the intermediate equalizing lever, diverging links connected with the lever frame and with the forwardly extending arm and the intermediate rearwardly extending arm, a longitudinal link connecting the inner end of the rear equalizing lever with the rearwardly extending long arm, a whiffletree connected with the main equalizing lever at one end thereof, and another whiffletree connected with the other end of the main equalizing lever and with the outer end of the rear equalizing lever.

In testimony, that I claim the foregoing as my own, I have hereto affixed my signature in the presence of two witnesses.

CHARLES PETERSON.

Witnesses:
H. HARRY C. PLAHN,
A. B. MOSMAN.

Copies of this patent may be obtained for five cents each, by addressing the "Commissioner of Patents, Washington, D. C."